United States Patent
Morikawa et al.

[11] Patent Number: 6,082,626
[45] Date of Patent: Jul. 4, 2000

[54] COOLING WATER CIRCUIT SYSTEM

[75] Inventors: Toshio Morikawa, Toyota; Yoshimitsu Inoue, Chiryu; Hajime Ito, Kariya; Hikaru Sugi, Nagoya, all of Japan

[73] Assignee: Denso Corporation, Kariya, Japan

[21] Appl. No.: 09/288,748

[22] Filed: Apr. 8, 1999

[30] Foreign Application Priority Data

Apr. 23, 1998 [JP] Japan .................................. 10-113835

[51] Int. Cl.[7] .................................................. B60H 1/02
[52] U.S. Cl. ...................................... 237/12.3 B; 237/2 A
[58] Field of Search ............................. 237/12.3 B, 2 A, 237/12.3 R; 165/103

[56] References Cited

U.S. PATENT DOCUMENTS 5,497,941  3/1996  Numazawa et al. .
5,678,760  10/1997  muso et al. .............................. 237/2 A
6,032,869  3/2000  Ito et al. ............................. 237/12.3 B

FOREIGN PATENT DOCUMENTS

U-5-93923  12/1993  Japan .
9-272327  10/1997  Japan .

*Primary Examiner*—Harold Joyce
*Assistant Examiner*—Derek Boles
*Attorney, Agent, or Firm*—Harness, Dickey & Pierce, PLC

[57] ABSTRACT

In a cooling water circuit system, cooling water pumped by a mechanically-driven first water pump circulates in a cooling water circuit, and flows through a radiator and a heater core in parallel in the cooling water circuit. An electrically-driven second water pump is disposed in the cooling water circuit at a position where cooling water to be supplied to the radiator from the first water pump and cooling water to be supplied to the heater core from the first water pump flow together. A check valve is provided in the cooling water circuit in parallel with the second water pump so that cooling water flows in one way from a water suction side of the second water pump toward a discharge side thereof. Thus, when the second water pump is operated, a total amount of cooling water pumped by the first water pump and the second water pump can flow through the radiator and the heater core. As a result, the cooling water circuit system can improve engine-cooling effect in the summer, while improving heating effect of a passenger compartment in the summer.

13 Claims, 5 Drawing Sheets

| MODE CONDITION | FIRST HEATING MODE | SECOND HEATING MODE | FIRST COOLING MODE | SECOND COOLING MODE |
|---|---|---|---|---|
| ENGINE SWITCH | ON | OFF | ON | OFF |
| WATER TEMP. | ≦ 60 °C | ≧ 70 °C | ≧ 100 °C | ≧ 100 °C |
| ROTATION SPEED | ≦ 1200 rpm | 0 rpm | ≦ 1200 rpm | 0 rpm |
| OUTSIDE AIR TEMP. | ≦ 10 °C | ≦ 10 °C | — | — |
| A/C OPERATION | MAXIMUM HEATING | ON | — | — |

FIG. 3

| MODE\nCONDITION | FIRST HEATING MODE | SECOND HEATING MODE | FIRST COOLING MODE | SECOND COOLING MODE |
|---|---|---|---|---|
| ENGINE SWITCH | ON | OFF | ON | OFF |
| WATER TEMP. | ≦60°C | ≧70°C | ≧100°C | ≧100°C |
| ROTATION SPEED | ≦1200rpm | 0rpm | ≦1200rpm | 0rpm |
| OUTSIDE AIR TEMP. | ≦10°C | ≦10°C | — | — |
| A/C OPERATION | MAXIMUM HEATING | ON | — | — |

COOLING WATER CIRCUIT SYSTEM

CROSS-REFERENCE TO RELATED APPLICATION

This application is related to and claims priority from Japanese Patent Application No. Hei. 10-113835 filed on Apr. 23, 1998, the contents of which are hereby incorporated by reference.

BACKGROUND OF THE INVENTION

1. Field of the Invention

The present invention relates to a cooling water circuit system which improves cooling effect for cooling water-cooled engine mounted on a vehicle in the summer while improving heating effect of a passenger compartment of the vehicle in the winter.

2. Description of Related Art

In a conventional heating apparatus described in JP-A-9-272327 by the applicant of the present invention, a heater core, a heat accumulating tank and an electrically-driven water pump are provided in a cooling water circuit, and a valve is provided to control amounts of cooling water flowing into a water-cooled engine, the heater core and the heat accumulating tank. When a heating mode is set when the engine is stopped, the electrically-driven water pump and the valve are operated so that cooling water circulates only between the heat accumulating tank and the heater core. Thus, even when the engine is stopped, air passing through the heater core is heated in the heater core by using high-temperature cooling water from the heat accumulating tank as a heating source.

However, in the conventional heating apparatus, because flow resistance of cooling water in the cooling water circuit becomes larger by providing the heat accumulating tank, it is necessary to operate the water pump with a high power. Further, because the cooling water circuit of the heating apparatus becomes complex by the heat accumulating tank, the valve for switching cooling water flow and a control circuit of the valve are also necessary, and the heating apparatus is produced in high cost.

SUMMARY OF THE INVENTION

In view of the foregoing problems, it is an object of the present invention to provide a cooling water circuit system having a simple structure, which improves cooling effect for cooling a vehicle engine in the summer while improving heating effect for a passenger compartment in the winter.

According to the present invention, in a cooling water circuit system, cooling water pumped by a first water pump which is driven by a water-cooled engine is circulated in a cooling water circuit, so that cooling water flows through a radiator and a heater core in parallel. An electrically-driven second water pump is disposed in the cooling water circuit at a position where cooling water to be supplied from the first water pump to the radiator and cooling water to be supplied from the first water pump to the heater core flow together. Further, a check valve is disposed in the cooling water circuit in parallel with the second water pump in such a manner that cooling water flows in one way from a water suction side of the second water pump toward a water discharge side of the second water pump. Thus, when the second water pump is operated, a total amount of cooling water pumped by the first water pump and cooling water pumped by the second water pump can be introduced into the radiator and the heater core. As a result, the cooling water circuit system can improve heating effect for a passenger compartment in the winter while improving engine-cooling effect in the summer.

Further, the check valve prevents cooling water only circulates between the water suction side of the second water is pump and the water discharge side of the second water pump. On the other hand, when the second water pump is stopped, the check valve is opened so that cooling water bypasses the second water pump. Thus, flow resistance in the cooling water circuit can be reduced when the second water pump is stopped. As a result, both the heating effect and cooling effect can be improved in the cooling water circuit system with a simple structure.

Preferably, during a heating mode when the engine is stopped, the second water pump is operated when the temperature of the cooling water is higher than a predetermined temperature. Therefore, even when the engine is stopped, cooling water flows into the heater core, and the heating mode can be obtained.

More preferably, during a heating mode when the engine is in idling, the second water pump is operated when the temperature of the cooling water is lower than a predetermined temperature. Therefore, even when the engine is in idling so that cooling water circulated by the first water pump is decreased, a total amount of cooling water flowing into the heater core can be increased because the second water pump is operated. Thus, even in the engine-idling, heating capacity of the heater core for the passenger compartment can be improved.

On the other hand, during a cooling mode for cooling the engine when the engine is stopped, the second water pump is operated when the temperature of cooling water is higher than a predetermined temperature. Therefore, even when the engine is stopped after being operated with a high load, cooling water flows into the radiator to be cooled because the second water pump is operated.

Preferably, during a cooling mode when the engine is in idling, the second water pump is operated when the temperature of cooling water is higher than a predetermined temperature. When the engine is in idling, a rotation speed of the engine is decreased, and amount of cooling water circulated by the first water pump is decreased. However, because the second water pump is operated, the amount of cooling water flowing into the radiator can be increased, and the engine-cooling capacity can be improved.

BRIEF DESCRIPTION OF THE DRAWINGS

Additional objects and advantages of the present invention will be more readily apparent from the following detailed description of preferred embodiments when taken together with the accompanying drawings, in which:

FIG. 3 is a diagram showing mode determination conditions for the flow diagram in FIG. 2;

DETAILED DESCRIPTION OF THE PRESENTLY PREFERRED EMBODIMENTS

Preferred embodiments of the present invention are described hereinafter with reference to the accompanying drawings.

Figure 1:
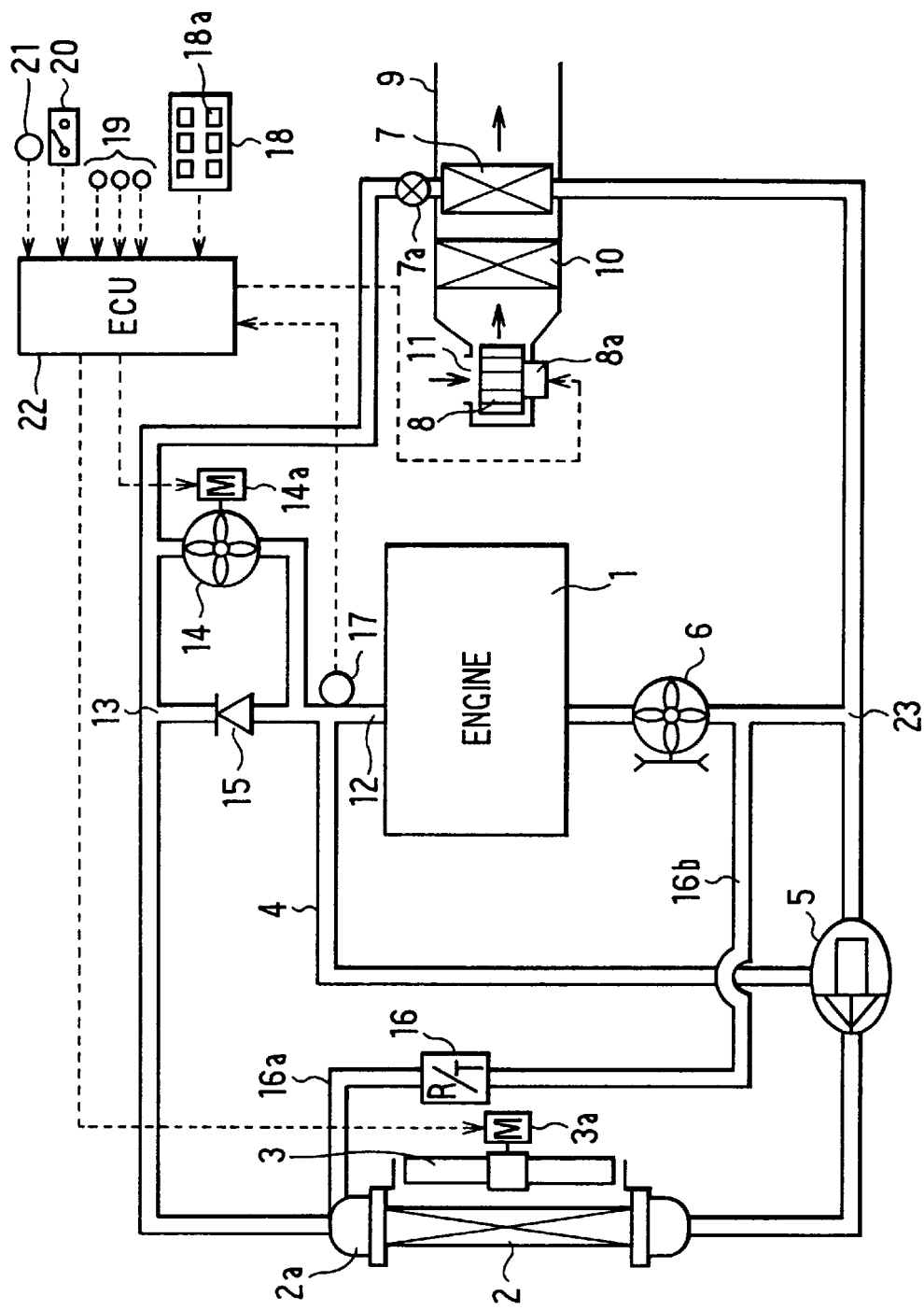
FIG. 1 is a schematic diagram of a cooling water circuit system according to a first preferred embodiment of the present invention.

A first preferred embodiment of the present invention will be now described with reference to FIGS. 1–4D. In the first embodiment, the present invention is typically applied to a hybrid vehicle using an engine and a motor as a driving source for running the vehicle. As shown in FIG. 1, in a cooling water circuit system of the first embodiment, a water-cooled engine (hereinafter referred to as "engine") 1 for running the vehicle is disposed in a cooling water circuit. A radiator 2 is disposed in the cooling water circuit to perform heat exchange between engine-cooling water (hot water) from the engine 1 and outside air blown by a cooling fan 3, so that engine-cooling water (hereinafter referred to as "cooling water") is cooled in the radiator 2 by outside air (i.e., air outside a passenger compartment). The cooling fan 3 is an axial flow fan driven electrically by a motor 3a.

A bypass passage 4 through which cooling water bypasses the radiator 2 is provided, and a thermostat (cooling-water temperature corresponding valve) 5 is disposed in the cooling water circuit. In the thermostat 5, a volume of a temperature-sensitive portion is changed as a temperature of cooling water changes, so that a valve body is displaced according to the temperature. That is, in the first embodiment, cooling water from the bypass passage 4 contacts the temperature-sensitive portion of the thermostat 5. When temperature of cooling water from the bypass passage 4 is low, the thermostat 5 is closed, so that cooling water flowing through the bypass passage 4 does not flows through the radiator 2. On the other hand, when the temperature of cooling water is increased to be higher than a predetermined temperature (e.g., 82° C.), the thermostat 5 opens a water passage for the radiator 2 so that cooling water flows through the radiator 2 to be cooled in the radiator 2.

Cooling water circulates in the cooling water circuit of the engine 1 by a mechanically-driven first water pump 6. That is, the rotation of a crankshaft of the engine 1 is transmitted to the water pump 6 through a transmission unit such as a belt, so that the first water pump 6 is mechanically driven by the engine 1. A heater core (i.e., heating heat exchanger) 7 disposed in the cooling water circuit heats air blown by a blower 8 by using the cooling water (hot water) as heating source.

In the cooling water circuit through which cooling water flows by the first water pump 6, the heater core 7 and the radiator 2 are arranged in parallel. A water valve 7a is disposed at a cooling-water inlet portion of the heater core 7, and adjusts an amount of cooling water flowing into the heater core 7.

The heater core 7 is disposed at a downstream air side of an evaporator (i.e., cooling heat exchanger) 10 within an air duct 9 forming an air passage through which conditioned air is blown into the passenger compartment. The air duct 9 has an air suction port 11 through which air is sucked by the blower 8. In an air conditioning apparatus, air sucked from the air suction port 11 by the blower 8 is cooled in the evaporator 10 and is heated in the heater core 7, so that the temperature of air blown into the passenger compartment can be controlled. The blower 8 has centrifugal fans electrically driven by a motor 8a.

An electrically-driven second water pump 14 is disposed in the cooling water circuit between a cooling water outlet 12 of the engine 1 and a branch point 13 at which cooling water from the cooling water outlet 12 of the engine 1 is branched into cooling water flowing toward the radiator 2 and cooling water flowing toward the heater core 7. The second water pump 14 is electrically driven by a motor 14a with a small power. For example, the flow amount (capacity) of cooling water pumped by the second water pump 14 is about 5–10 liter/min. A check valve 15 is disposed between the cooling water outlet 12 of the engine 1 and the branch point 13 in parallel with the second water pump 14, so that cooling water flows in one way from the cooling water outlet 12 of the engine 1 toward the branch point 13. That is, the second water pump 14 and the check valve 15 are arranged in parallel in a cooling water passage where cooling water pumped by the first water pump 6 flows, at a position in which cooling water to be supplied toward the radiator 2 and cooling water to be supplied toward the heater core 7 flow together.

A completely-sealed type reserve tank 16 is mounted on the vehicle at a position upper than an upper tank 2a of the radiator 2. An inlet pipe 16a of the reserve tank 16 is connected to the upper tank 2a of the radiator 2, and an outlet pipe 16b of the reserve tank 16 is connected to a water suction side of the first water pump 6. A cap member having a pressure-response valve is disposed at an upper portion of the reserve tank 16. When pressure in the cooling water circuit of the engine 1 is increased to be larger than a predetermined pressure, the pressure-response valve of the cap member is opened. The reserve tank 16 has a volume which can absorb a volume change due to a temperature change of the cooling water. Air contained in the cooling water is separated in the receive tank 16, and is discharged to an outside when the pressure-response valve of the cap member is opened.

A water temperature sensor 17 for detecting a temperature of the cooling water is disposed at a position proximate to the cooling water outlet 12 of the engine 1. The water temperature sensor 17 is composed of a temperature sensitive element such as thermistor.

A control panel 18 of the air conditioning apparatus has a switch group 18a such as an auto-air conditioning switch for automatically controlling air-conditioning operation, a temperature setting switch for setting a target air temperature, an air outlet mode switch, and an air-blowing control switch of the blower 8.

A sensor group 19 of the air conditioning apparatus includes an inside air temperature sensor for detecting the temperature of inside air (i.e., air inside the passenger compartment), an outside air temperature sensor for detecting the temperature of outside air (i.e., air outside the passenger compartment), a sunlight amount sensor for detecting an amount of sunlight entering into the passenger compartment, and an evaporator temperature sensor for detecting the temperature of air cooled by the evaporator 10. Further, an engine switch 20 for switching operation of the engine 1 and a rotation speed sensor 21 for detecting the rotation speed of the engine are provided.

An electronic control unit (hereinafter referred to as "ECU") 22 is composed of a micro-computer and circuits around the micro-computer. Signals from the water temperature sensor 17, the switch group 18a, the sensor group 19, the engine switch 20 and the rotation speed sensor 21 are input into the ECU 22, and operation of second water pump 14 is controlled by the ECU 22 based on the result calculated according to pre-set program. Further, the ECU 22 controls the operation of the cooling fan 3 for the radiator 2, the rotation speed of the cooling fan 3 and the operation of the blower 8 according to the input signals.

Figure 2:
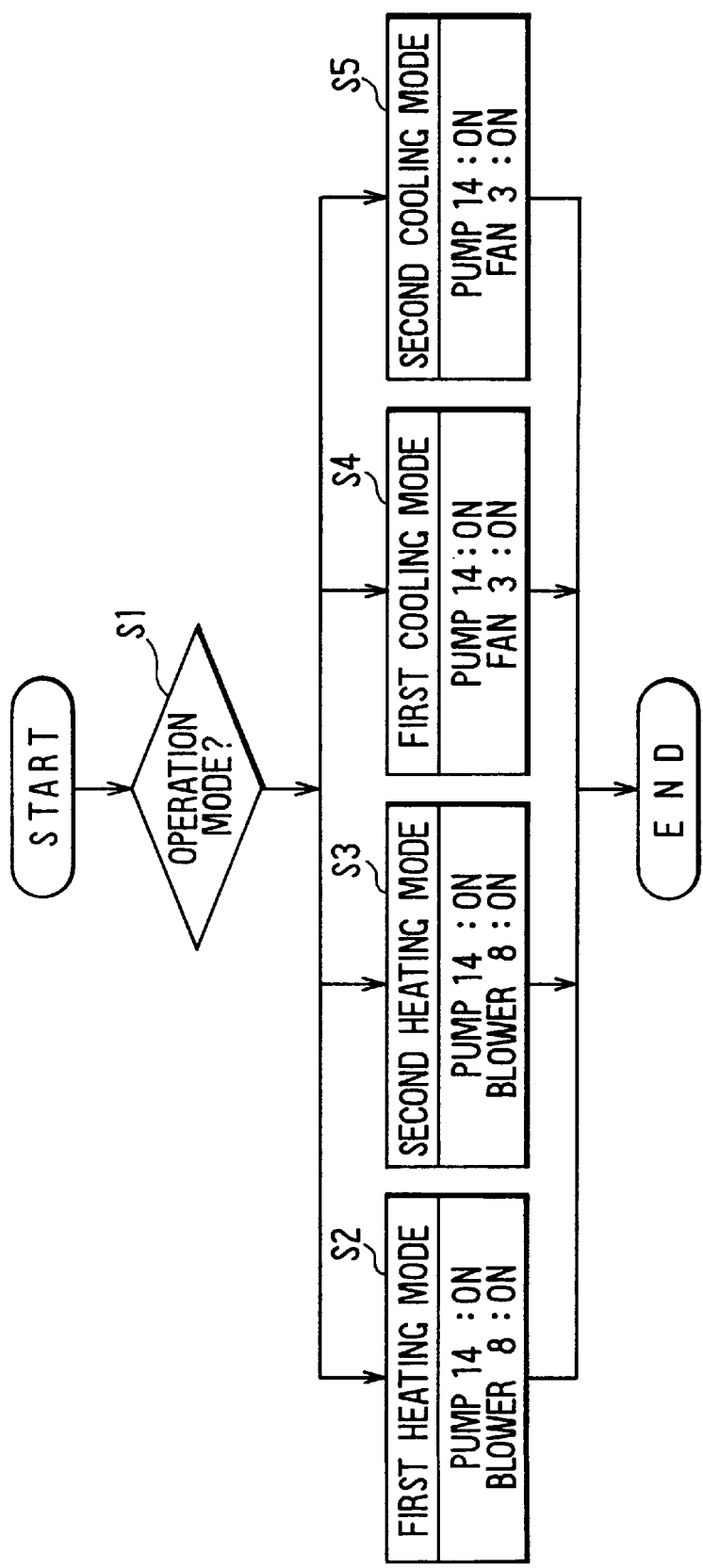
FIG. 2 is a flow diagram showing operation of a control unit of the cooling water circuit system according to the first embodiment.

Next, operation of the cooling water circuit system according to the first embodiment of the present invention will be now described. The control operation of the ECU 22 is simply indicated in FIG. 2. As shown in FIG. 2, the control operation of the ECU 22 is started when the ECU 22 is electrically connected to a vehicle battery. As step S1, operation mode of the cooling water circuit system is determined based on a mode determination condition shown in FIG. 3.

That is, as shown in FIG. 3, a first heating mode, i.e., a heating mode in an engine-idling is selected, when the engine switch 20 is turned on, the water temperature detected by the water temperature sensor 17 is lower than a predetermined temperature (e.g., 60° C.), the engine rotation speed detected by the rotation speed sensor 21 of the engine 21 is lower than a predetermined speed (e.g., 1200 rpm), the outside air temperature detected by the outside air temperature sensor of the sensor group 19 is lower than a predetermined temperature (e.g., 10° C.), and a maximum heating is set in the air conditioning operation.

In the first embodiment of the present invention, because the flow amount of cooling water flowing into the heater core 7 is adjusted by the water valve 7a, the water valve 7a is fully opened so that water flows into the heater core 7 in maximum when the maximum heating is set. On the other hand, in a case where the temperature of air blown into the passenger compartment is adjusted by an air mixing door, when the maximum heating is set, the air mixing door fully opens an air-blowing passage of the heater core 7 while fully closing a cool air bypass passage through which cool air having passed through the evaporator 10 bypasses the heater core 7.

When the first heating mode (i.e., heating mode in the engine-idling) is selected at step S1 in FIG. 2, the second water pump 14 and the blower 8 are operated at step S2 in FIG. 2. That is, at step S2, the cooling water of the engine 1 circulates in the cooling water circuit with a total capacity adding the capacity of the second water pump 14 to the capacity of the first water pump 6. During the first heating mode, cooling water pumped by the first water pump 6 flows through the engine 1, the check valve 15, the water valve 7a and the heater core 7, and returns to the first water pump 6. Further, cooling water pumped by the second water pump 14 flows through the water valve 7a, the heater core 7, the first water pump 6 and the engine 1, and returns to the second water pump 14. Because the thermostat 5 is opened when the temperature of cooling water is high enough (e.g., ≧82° C.), cooling water does not flows into the radiator 2 during the first heating mode where the temperature of cooling water is lower than 60° C., for example.

During the first heating mode, because the engine 1 is in idling, the rotation speed of the first water pump 6 driven by the engine 1 is decreased, and the flow amount of cooling water pumped by the first water pump 6 is decreased. However, in the first embodiment of the present invention, the flow amount of cooling water in the cooling water circuit is increased by the operation of the second water pump 14 which is electrically driven. Further, in this case, cooling water does not flows through the radiator 2 by the thermostat 5. Therefore, the amount of cooling water flowing into the heater core 7 can be further increased, and heating capacity of the heater core 7 can be improved even during the engine-idling.

On the other hand, even during the engine-idling, the electrically-driven second water pump is not operated, when the water temperature detected by the water temperature sensor 17, the outside air temperature detected by the outside air temperature sensor and the air conditioning operation do not satisfy the conditions indicated in the first heating mode in FIG. 3. Therefore, consumption electric power of the second water pump 14 can be reduced, and the durability thereof can be improved.

Next, a second heating mode where the engine 1 is stopped is selected, when the engine switch 20 is turned off, the water temperature is higher than a predetermined temperature (e.g., 70° C.), the temperature of outside air is lower than a predetermined temperature (e.g., 10° C.), and the air conditioning operation switch is turned on. When the second heating mode is selected at step S1, the second water pump 14 and the blower 8 are turned on at step S3. During the second heating mode, even when the first water pump 6 driven by the engine 1 is stopped, cooling water continually flows into the heater core 7 by the operation of the second water pump 14, and it is possible to continue the heating operation after the engine stops. Thus, even in a case where the engine 1 is stopped and the hybrid vehicle is traveled by an electrical motor, the heating operation can be continued. The check valve 15 shown in FIG. 1 is provided to prevent cooling water directly flows from a discharge side of the second water pump 14 to a suction side thereof.

When the water temperature is decreased and is lower than a predetermined temperature (e.g., 70° C.) during the second heating mode, the second water pump 14 and the blower 8 are stopped, and operation of the second heating mode is stopped. Thus, it can prevent the water temperature from being excessively lowered and engine-starting performance for next time from being deteriorated, while the temperature of air blown into the passenger compartment is prevented from being lowered.

According to the first embodiment of the present invention, even when the engine 1 is stopped, high-temperature cooling water within the engine 1 and high-temperature cooling water within the reserve tank 16 circulates in the cooling water circuit by the operation of the second water pump 14 when the second heating mode is selected. Therefore, the second heating mode can be continued in a long time after the engine 1 stops.

Next, operation of the cooling water circuit system for improving engine-cooling performance in the summer will be now described. As shown in FIG. 3, a first cooling mode during an engine-idling is selected ar step S1, when the engine switch 20 is turned on, the water temperature is higher than a predetermined temperature (e.g., 100° C.) and the rotational speed of the engine 1 is lower than a predetermined speed (e.g., 1200 rpm). When the first cooling mode is selected at step S1 in FIG. 2, the electrically-driven second water pump 14 and the cooling fan 3 are operated at step S4 in FIG. 2. When the temperature of cooling water is higher than the predetermined temperature (e.g., 82° C.), the valve of the thermostat 5 is opened. Therefore, during the first cooling mode, the valve of the thermostat 5 is opened, and cooling water pumped by the first water pump 6 and the second water pump 14 flows into the radiator 2 to be cooled in the radiator 2.

Thus, even when the rotation speed of the first water pump 6 is decreased during the engine-idling, cooling water pumped by the second water pump 14 is also introduced into the radiator in the cooling water circuit; and therefore, the engine-cooling performance during the engine-idling can be improved.

When the vehicle is travelled with high load in the summer, heat-generating amount from the engine 1 becomes larger. Further, in the summer, the temperature of air passing through the radiator 2 is high. Thus, in this case, cooling capacity of the radiator 2 for cooling the cooling water of the engine 1 may be insufficient. As a result, the temperature of the cooling water may be higher than 100° C. Thereafter, when the engine 1 is operated in idling, the temperature of the cooling water may be further increased because the cooling capacity of the radiator 2 is decreased. However, in the first embodiment of the present invention, the amount of cooling water flowing into the radiator 2 is increased by the second water pump 14, thereby improving the cooling capacity of the radiator 2.

Next, in FIG. 3, the second cooling mode where the engine 1 is stopped is selected, when the engine switch 20 is turned off and the water temperature is equal to or higher than a predetermined temperature (e.g., 100° C.), as shown in FIG. 3. When the second cooling mode is selected at step S1 in FIG. 1 when the operation of the engine 1 is stopped, the electrically-driven second water pump 14 and the cooling fan 3 are operated at step S5 in FIG. 2. Thus, even when the operation of the engine 1 is stopped and the first water pump 6 mechanically driven by the engine 1 is stopped, cooling water pumped by the second water pump 14 flows into the radiator 2 to be circulated in the cooling water circuit. As a result, the cooling capacity for cooling the engine-cooling water by the radiator 2 can be continued during the second cooling mode.

When the second cooling mode is continued after the engine stops so that the water temperature is decreased to a predetermined temperature (e.g., 95° C.), both of the second water pump 14 and the cooling fan 3 are stopped, and the operation of the second cooling mode is stopped.

When the operation of the cooling fan 3 is stopped when the engine 1 is stopped immediately after the vehicle is travelled with a high load in the summer, the cooling operation due to the radiator 2 is stopped; and therefore, the water temperature may be excessively increased by the heat quantity of the engine 1 itself. However, in the first embodiment, the second cooling mode is performed even when the engine 1 is stopped, it can prevent the water temperature from being excessively increased.

In the first embodiment of the present invention, when the engine 1 is generally operated except for the engine-idling, the second water pump 14 is continued to be stopped, and general heating operation for the passenger compartment and general cooling operation for the engine 1 are performed in the cooling water circuit system. In this case, the check valve 15 disposed in parallel with the second water pump 14 is opened, and cooling water flows through the check valve 15. Thus, during the general operation of the engine 1, the water flow resistance is not increased in the cooling water circuit by providing the second water pump 14.

Figure 4A:
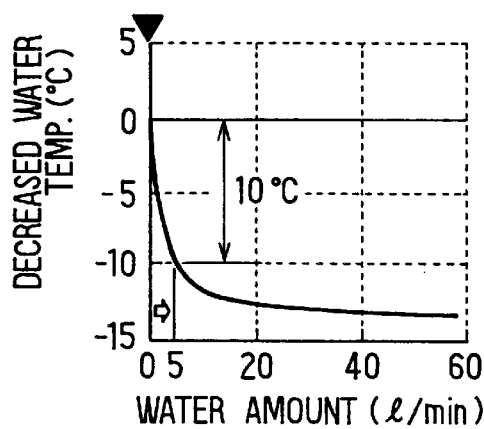
FIG. 4A is a graph showing the relationship between a water amount flowing into a radiator and a decreased water temperature, during a cooling mode when a water-cooled engine is stopped.

The inventors of the present invention perform the experiments shown in FIGS. 4A–4D. Here, the effect of the present invention will be now described with reference to FIGS. 4A–4D. When the second cooling mode is set when the engine 1 is stopped in the summer, the relationship between the amount of cooling water flowing into the radiator 2 due to the second water pump 14 and the decreased temperature of the cooling water is shown in FIG. 4A. In FIG. 4A, "▼" shows the flow amount of cooling water flowing into the radiator 2 by the operation of the first water pump 6. When the second cooling mode is performed by the second water pump 14 having a motor power of 20 W, the amount of cooling water flowing into the radiator 2 is 5 liter/min. It is compared with a case where the second cooling mode is not performed when the engine 1 is stopped, the temperature of cooling water is approximately decreased by 10° C. That is, the decreased temperature of the cooling water is approximately 10° C.

Figure 4B:
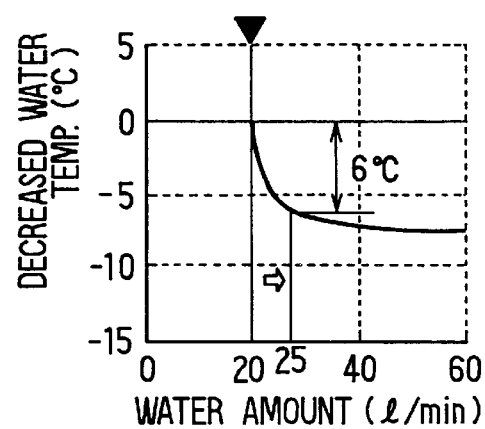
FIG. 4B is a graph showing the relationship between water amount flowing into the radiator and a decreased water temperature, during a cooling mode in an engine-idling.

When the first cooling mode is set during the engine idling in the summer, the relationship between water amount pumped by both of the first water pump 6 and the second water pump 14 and the decreased temperature of cooling water is indicated in FIG. 4B. In FIG. 4B, "▼" shows the flow amount of cooling water flowing into the radiator 2 only by the operation of the first water pump 6. When the second water pump 14 is not operated, the amount of cooling water flowing into the radiator is 20 liter/min. When the first cooling mode is performed by the first water pump 6 and the second water pump 14 with power of 20 W, the amount of cooling water flowing into the radiator is increased to 25 liter/min, and the decreased temperature of cooling water is approximately 6° C. as compared with a case where cooling water is pumped by only the first water pump 6 during the engine-idling.

Figure 4C:
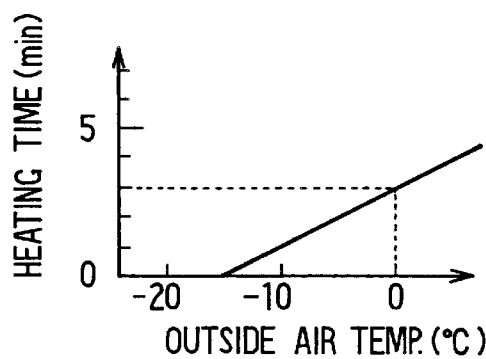
FIG. 4C is a graph showing the relationship between heating time for continuing heating operation and an outside air temperature, during a heating mode when the engine is stopped.

When the second heating mode is set when the engine 1 is stopped, the relationship between the heating time for continuing the second heating mode and the outside air temperature is indicated in FIG. 4C. Here, the heating time for continuing the second heating mode is time until the temperature of air blown into the passenger compartment is decreased to 45° C. after the second heating mode stars. When the amount of cooling water pumped by the second water pump 14 is set to 6 liter/min, the continued heating time is 3 minutes when the outside air temperature is 0° C., as shown in FIG. 4C.

Figure 4D:
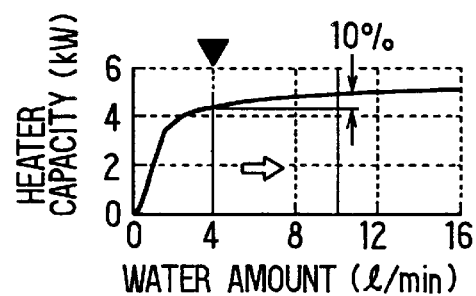
FIG. 4D is a graph showing the relationship between heating capacity and a water amount flowing into a heater core during a heating mode in the engine-idling.

Further, when the first heating mode is set during the engine-idling, the relationship between the heating capacity of the heater core 7 and the amount of cooling water flowing into the heater core 7 is indicated in FIG. 4D. In FIG. 4D, "▼" shows the flow amount of cooling water flowing into the heater core 7 only by the operation of the first water pump 6. When the cooling water is pumped by only the first water pump 6, the amount of cooling water flowing into the heater core 7 is 4 liter/min. However, in the first embodiment, the cooling water is pumped by both of the first water pump 6 and the second water pump 14 with a power of 20 W, the amount of cooling water flowing into the heater core 7 is increased to 10 liter/min. Thus, during the first heating mode, the heating capacity of the heater core 7 is increased by 10%, and the temperature of air blown into the passenger compartment is increased by 4° C.

Figure 5:
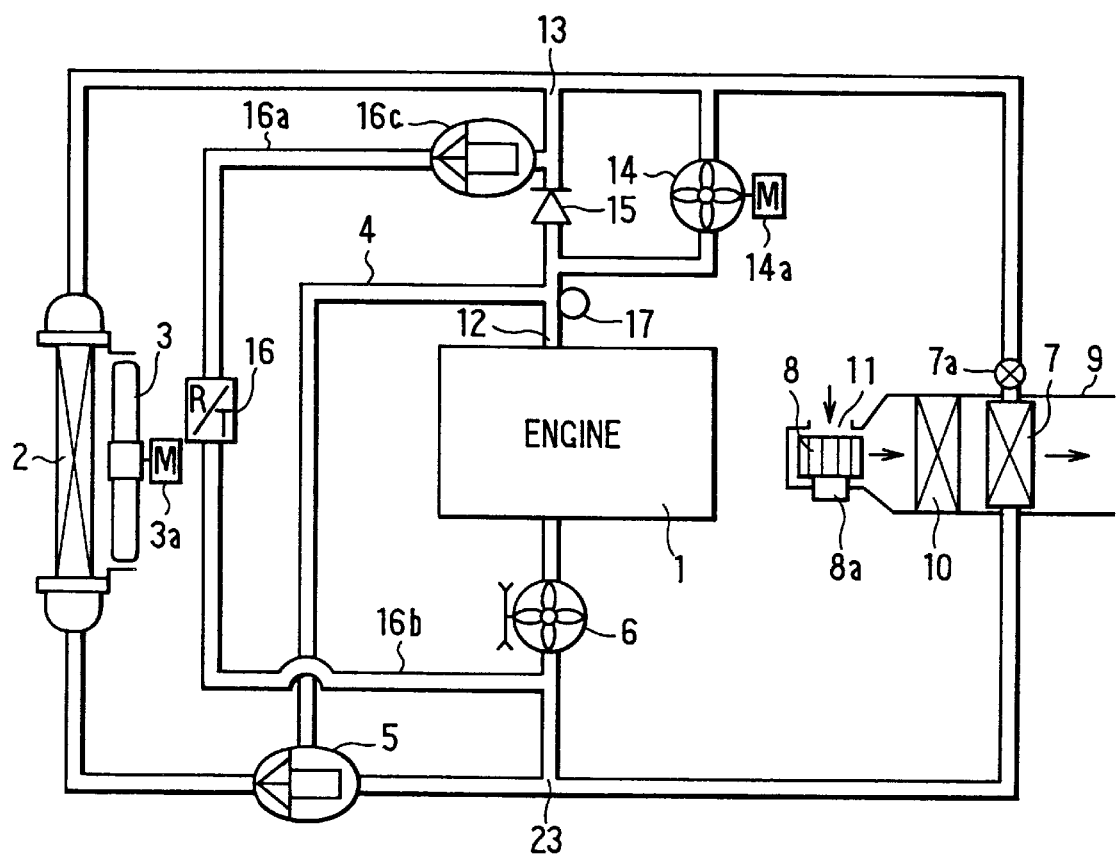
FIG. 5 is a schematic diagram of a cooling water circuit system according to a second preferred embodiment of the present invention.

A second preferred embodiment of the present invention will be now described with reference to FIG. 5. In the second embodiment, the cap member having the pressure-response valve is disposed at an upper side of the completely sealed reserve tank 16, similarly to the first embodiment. In the second embodiment, a supplementary thermostat 16c is provided at an inlet portion of the inlet pipe 16a from which cooling water flows into the reserve tank 16, and the inlet pipe 16a is connected to the cooling water circuit at a position proximate to the branch point 13. On the other hand, the outlet pipe 16b through which cooling water flows from the reserve tank 16 is connected to the water suction side of the first water pump 6, similarly to the first embodiment.

In the second embodiment of the present invention, the valve-opening temperature of the supplementary thermostat 16c is set a predetermined temperature (e.g., 60° C.) which is sufficiently lower than the valve-opening temperature (e.g., 82° C.) of the thermostat 5. In the second embodiment, the other components of the cooling water circuit system are similar to those in the first embodiment, and the explanation thereof is omitted.

Next, the operation of the cooling water circuit system according to the second embodiment of the present invention will be now described. When the second heating mode is set when the engine 1 is stopped, the supplementary thermostat 16c is opened when the water temperature is higher than the valve-opening temperature (e.g., 60° C.), and the second heating mode similar to the first embodiment is performed.

On the other hand, at an engine-starting time, because the temperature of cooling water is lower than the valve-opening temperature (e.g., 60° C.), the supplementary thermostat 16c is closed. Therefore, in this case, cooling water does not circulates in the reserve tank 16. Thus, the amount of cooling water circulating in the cooling water circuit is reduced at the engine-starting time, and the temperature of the cooling water can be quickly increased.

Further, when the temperature of cooling water is increased and the supplementary thermostat 16c is opened, cooling water flows into the reserve tank 16. Therefore, air contained in the cooling water can be separated in the reserve tank 16, and high-temperature cooling water can be stored in the reserve tank 16 so that cooling water in the reserve tank 16 can be used for the next second heating mode where the engine 1 is stopped.

Although the present invention has been fully described in connection with preferred embodiments thereof with reference to the accompanying drawings, it is to be noted that various changes and modifications will become apparent to those skilled in the art.

For example, in the above-described first and second embodiments, the electrically-driven second water pump 14 and the check valve 15 are disposed in the cooling water circuit in parallel between the cooling water outlet 12 of the engine 1 and the branch point 13 where cooling water from the first water pump 6 is branched into cooling water flowing toward the radiator 2 and cooling water flowing toward heater core 7. However, the electrically-driven second water pump 14 and the check valve 15 may be disposed in parallel between a suction side of the first water pump 6 and a joint point 23 where cooling water from the radiator 2 and cooling water from the heater core 7 are joined. That is, the second water pump 14 and the check valve 15 may be disposed in parallel in the cooling water circuit at a position where cooling water from the radiator 2 and cooling water from the heater core 7 flows together.

Further, in the above-described embodiments, the operation of the second water pump 14 is controlled by the ECU 22 according to the conditions shown in FIG. 3. However, the operation of the second water pump 14 may be controlled only based on the water temperature. In this case, the ECU 22 may be omitted. When the operation of the second water pump 14 is controlled only by the water temperature, the second water pump 14 is operated when the water temperature is equal to or higher than a predetermined temperature (e.g., 100° C.) in the summer, so that cooling performance of the radiator 2 is improved. On the other hand, in the winter, the second water pump 14 is operated when the water temperature is equal to or is lower than a predetermined temperature (e.g., 60° C.). Thus, in this case, the operation of the second water pump 14 can be readily controlled by using a simple water temperature switch.

Such changes and modifications are to be understood as being within the scope of the present invention as defined by the appended claims.

What is claimed is:

1. A cooling water circuit system for cooling a water-cooled engine of a vehicle and for heating air blown into a passenger compartment of the vehicle, said cooling water circuit system comprising:

means for forming a cooling water circuit in which cooling water for cooling the engine circulates;

a radiator for cooling the cooling water in said cooling water circuit;

a heater core for heating air blown into the passenger compartment by using cooling water in said cooling water circuit as a heating source;

a first water pump mechanically driven by the engine, said first water pump being disposed in said cooling water circuit in such a manner that cooling water pumped by said first water pump flows through said radiator and said heater core in parallel;

an electrically-driven second water pump disposed in said cooling water circuit at a position where cooling water to be supplied from said first water pump to said radiator and cooling water to be supplied from said first water pump to said heater core flow together, said second water pump having a suction side for sucking cooling water and a discharge side for discharging cooling water; and a check valve disposed in said cooling water circuit in parallel with said second water pump in such a manner that cooling water flows in one way from said suction side of said second water pump toward said discharge side of said second water pump.

2. The cooling water circuit system according to claim 1, wherein:

said cooling water circuit has a branch point where cooling water from said first water pump is branched into cooling water flowing toward said radiator and cooling water flowing toward said heater core; and said second water pump and said check valve are disposed in said cooling water circuit in parallel between said branch point and a cooling water outlet of the engine.

3. The cooling water circuit system according to claim 1, wherein said second water pump is operated, during a heating mode for heating the passenger compartment when the engine is stopped.

4. The cooling water circuit system according to claim 3, wherein said second water pump is operated, when the temperature of cooling water is higher than a predetermined temperature during the heating mode when the engine is stopped.

5. The cooling water circuit system according to claim 1, wherein said second water pump is operated, during a heating mode for heating the passenger compartment when the engine is in idling.

6. The cooling water circuit system according to claim 5, wherein said second water pump is operated, when the temperature of cooling water is lower than a predetermined temperature during the heating mode when the engine is in idling.

7. The cooling water circuit system according to claim 1, wherein said second water pump is operated during a cooling mode for cooling the engine, when temperature of cooling water is higher than a predetermined temperature when the engine is stopped.

8. The cooling water circuit system according to claim 1, wherein said second water pump is operated during a cooling mode for cooling the engine, when temperature of cooling water is higher than a predetermined temperature when the engine is in idling.

9. The cooling water circuit system according to claim 1, further comprising a reserve tank for separating air contained in cooling water, said reserve tank being disposed in said cooling water circuit in such a manner that cooling water circulates in said cooling water circuit by said first water pump and said second water pump, wherein said second water pump is operated so that cooling water within said reserve tank circulates in said cooling water circuit, during a heating mode for heating the passenger compartment when the engine is stopped.

10. The cooling water circuit system according to claim 9, further comprising a valve for opening and closing said reserve tank according to temperature of cooling water in said cooling water circuit, wherein said valve is opened so that cooling water in said cooling water circuit flows into said reserve tank, when the temperature of cooling water in the cooling water circuit is higher than a predetermined temperature.

11. The cooling water circuit system according to claim 1, wherein said check valve is opened so that cooling water bypasses said second water pump, when said second water pump is stopped.

12. A cooling water circuit system for cooling a water-cooled engine of a vehicle and for heating air blown into a passenger compartment of the vehicle, said cooling water circuit system comprising:

means for forming a cooling water circuit in which cooling water for cooling the engine circulates;

a radiator for cooling the cooling water in said cooling water circuit;

a heater core for heating air blown into the passenger compartment by using cooling water in said cooling water circuit as a heating source;

a first water pump mechanically driven by the engine, said first water pump being disposed in said cooling water circuit in such a manner that cooling water pumped by said first water pump flows through said radiator and said heater core in parallel;

an electrically-driven second water pump disposed in said cooling water circuit at a position where cooling water from said radiator and cooling water from said heater core flows together, said second water pump having a suction side for sucking cooling water and a discharge side for discharging cooling water; and a check valve disposed in said cooling water circuit in parallel with said second water pump in such a manner that cooling water flows in one way from said suction side of said second water pump toward said discharge side of said second water pump.

13. The cooling water circuit system according to claim 12, wherein:

said cooling water circuit has a joint point where cooling water from said radiator and cooling water from said heater core are joined; and said second water pump and said check valve are disposed in said cooling water circuit in parallel between said joint point and a suction side of said first water pump.

* * * * *